United States Patent [19]

Wu

[11] Patent Number: 5,291,730
[45] Date of Patent: Mar. 8, 1994

[54] KNUCKLE CONNECTOR FOR CONNECTING END KNUCKLES OF A CHAIN STRAND

[75] Inventor: Nick Wu, Tainan, Taiwan
[73] Assignee: KMC Chain Industrial Co., Ltd., Taiwan
[21] Appl. No.: 44,943
[22] Filed: Apr. 8, 1993
[51] Int. Cl.⁵ ............................... F16G 13/02
[52] U.S. Cl. .......................... 59/85; 59/4; 59/5; 474/220
[58] Field of Search ............... 59/4, 5, 78, 85; 474/218, 220, 223

[56] References Cited

U.S. PATENT DOCUMENTS

| | | | |
|---|---|---|---|
| 586,472 | 7/1897 | Appleby | 474/220 |
| 628,386 | 7/1899 | Berry et al. | 474/220 |
| 891,189 | 6/1908 | Schmidt, Jr. | 474/220 |
| 4,043,215 | 8/1977 | Long et al. | 59/85 |
| 5,178,585 | 1/1993 | Lin et al. | 474/206 |
| 5,186,569 | 2/1993 | Wu | 474/220 |

*Primary Examiner*—David Jones
*Attorney, Agent, or Firm*—Gifford, Groh, Sprinkle, Patmore and Anderson

[57] ABSTRACT

A knuckle connector is used to connect spacedly end knuckles of a chain strand to form a chain loop. The knuckle connector includes a pair of link units, each of which has a link pin and an oval-shaped link plate formed with a circular through-hole on one end and a retaining hole on an opposite end. The link pin has a head secured in the through hole and a tail end formed with a peripheral channel. The link pin of one of the link units extends through a pin hole formed in a corresponding one of the end knuckles such that the peripheral channel initially extends into a large insert part of the retaining hole in the link plate of a remaining one of the link units. The peripheral channel of the link pin of one of the link units engages the link plate of the remaining one of the link units in a diameter-reduced retaining part of the retaining hole when the end knuckles are pulled apart. The link plate of each link unit is provided with an inclined stop member that includes a cantilevered tab and terminates at an end knuckle abutment face. The inclined stop member is formed by punching the link plate at one side of the insert part of the retaining hole opposite to the retaining part. The stop members of the link plates extend into a space between the end knuckles and face a respective one of the end knuckles. The stop members prevent movement of the end knuckles toward one another.

1 Claim, 5 Drawing Sheets

KNUCKLE CONNECTOR FOR CONNECTING END KNUCKLES OF A CHAIN STRAND

BACKGROUND OF THE INVENTION

1. Field of the Invention

The invention relates to a knuckle connector for connecting spacedly end knuckles of a chain strand, more particularly to a knuckle connector which is easy to assemble and which has provisions to prevent untimely disengagement of the end knuckles of the chain strand.

2. Description of the Prior Art

In a conventional chain manufacturing process, a chain strand is formed by interconnecting adjacent knuckles thereof by means of rivets. During use, the end knuckles of the chain strand are joined together by means of a rivet so as to form a chain loop. Riveting of the end knuckles by the end user makes difficult the assembly of the chain loop.

In order to overcome the above drawback, a knuckle connector has been developed so as to simplify the connection of the end knuckles. Referring to FIG. 1, a knuckle connector (1) is used to interconnect the end knuckles (21, 21') of a chain strand (2) in order to form a chain loop. The knuckle connector (1) comprises a pair of link units (11, 11'), each of which includes a link pin (12, 12') and a link plate (13, 13'). The link pin (12, 12') includes a shank with a head (121) and a tail end that is formed with a peripheral channel (122, 122'). The link plate (13, 13') is oval-shaped and is formed With a circular through-hole (131) on one end and a retaining hole (132, 132') on an opposite end. The retaining hole (132, 132') has an outline similar to the number "8" and includes a large insert part (133, 133') and a diameter-reduced retaining part (134, 134') that is communicated with the insert part (133, 133'). During manufacture of the knuckle connector (1), the link pin (12, 12') is extended into the circular through-hole (131) in the link plate (13, 13') such that the head (121) of the former is secured in the through-hole (131) of the latter.

Referring to FIG. 2, when the knuckle connector (1) is used to interconnect the end knuckles (21, 21') of a chain strand (2), the link pins (12, 12') of the link units (11, 11') are extended through a pin hole formed in a corresponding one of the end knuckles (21, 21') such that the peripheral channel (122, 122') extends into the insert part (133, 133') of the retaining hole (132, 132') in the link plate (13, 13') of a remaining one of the link units (11, 11'). The end knuckles (21, 21') are then pulled apart so that the peripheral channel (122, 122') of the link pin (12, 12') of one of the link units (11, 11') engages the link plate (13, 13') of the remaining one of the link units (11, 11') in the retaining part (134, 134') of the retaining hole (132, 132') of the latter, thereby forming a chain loop.

From the foregoing, it can be seen that no additional tool is needed to join the end knuckles (21, 21') of the chain strand (2) if the knuckle connector (1) is employed. However, the main drawback of the conventional knuckle connector (1) is as follows:

It is common for two adjacent knuckles to experience oppositely oriented forces when the chain loop is in use. Referring once more to FIG. 2, if the distance between the link pins (12, 12') is instantaneously reduced due to the presence of the oppositely oriented forces, the peripheral channels (122, 122') of the link pins (12, 12') may simultaneously move from the retaining part (134, 134') of the retaining hole (132, 132') to the insert part (133, 133'), thereby causing the untimely disengagement of the link pins (12, 12') from the link plates (13, 13'). Therefore, untimely disengagement of the end knuckles (21, 21') can occur when the conventional knuckle connector (1) is in use.

SUMMARY OF THE INVENTION

The main objective of the present invention is to provide a knuckle connector for connecting end knuckles of a chain strand so as to form a chain loop, which knuckle connector is easy to assemble and can prevent the untimely disengagement of the end knuckles of the chain strand from occurring.

Accordingly, the knuckle connector of the present invention is used to connect spacedly end knuckles of a chain strand to form a chain loop. The knuckle connector comprises a pair of link units, each of which includes a link pin and an oval-shaped link plate formed with a circular through-hole on one end and a retaining hole on an opposite end. The retaining hole includes a large insert part and a diameter-reduced retaining part that is communicated with the insert part. The link pin has a head secured in the through-hole and a tail end formed with a peripheral channel. The link pin of one of the link units extends through a pin hole formed in a corresponding one of the end knuckles such that the peripheral channel initially extends into the insert part of the retaining hole in the link plate of a remaining one of the link units. The peripheral neck of the link pin of one of the link units engages the link plate of the remaining one of the link units in the retaining part of the retaining hole when the end knuckles are pulled apart. The link plate of each link unit is provided with an inclined stop member that is formed by punching the link plate at one side of the insert part of the retaining hole opposite to the retaining part. The stop members of the link plates include cantilevered tabs that terminate at an end knuckle abutment face. The stop members extend into a space between the end knuckles and face a respective one of the end knuckles. The stop members can thus prevent movement of the end knuckles toward one another.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
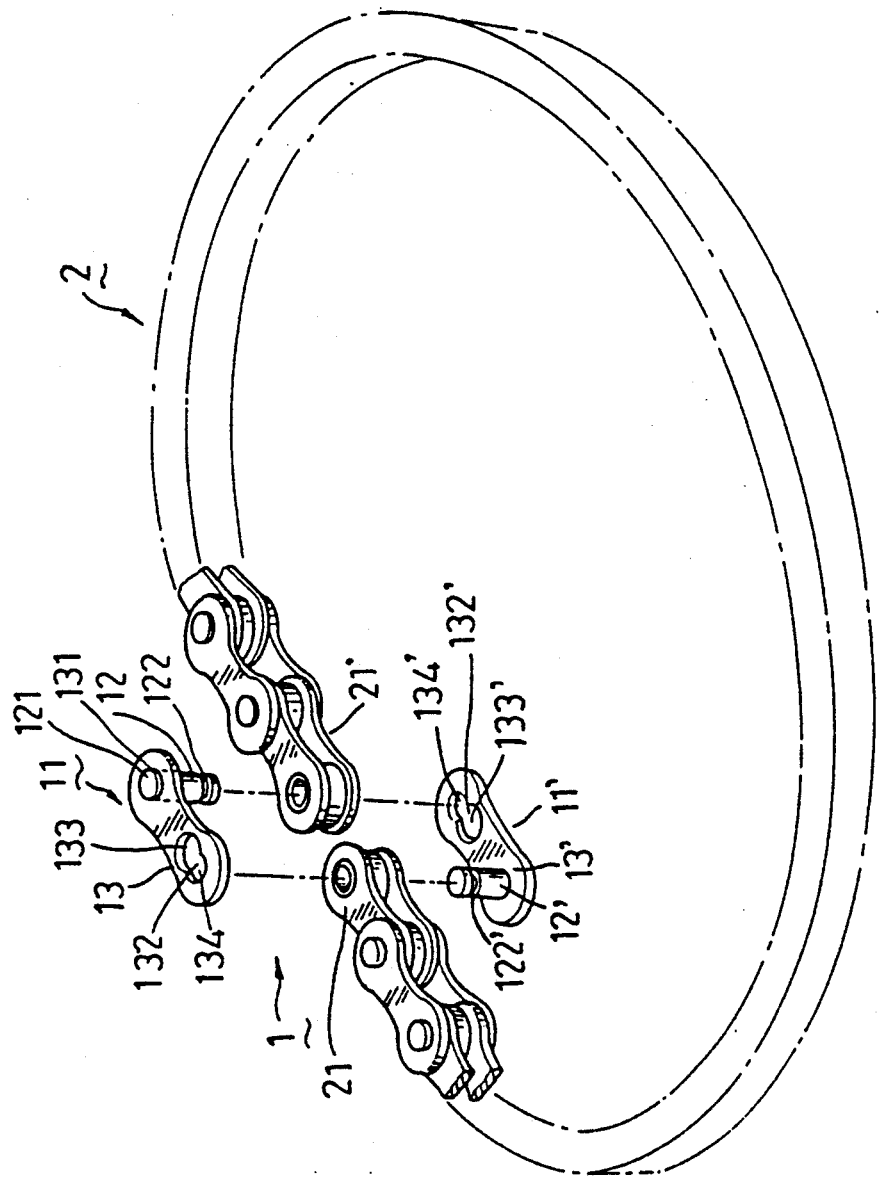
FIG. 1 is an exploded view of a conventional knuckle connector for connecting end knuckles of a chain strand.
Figure 2:
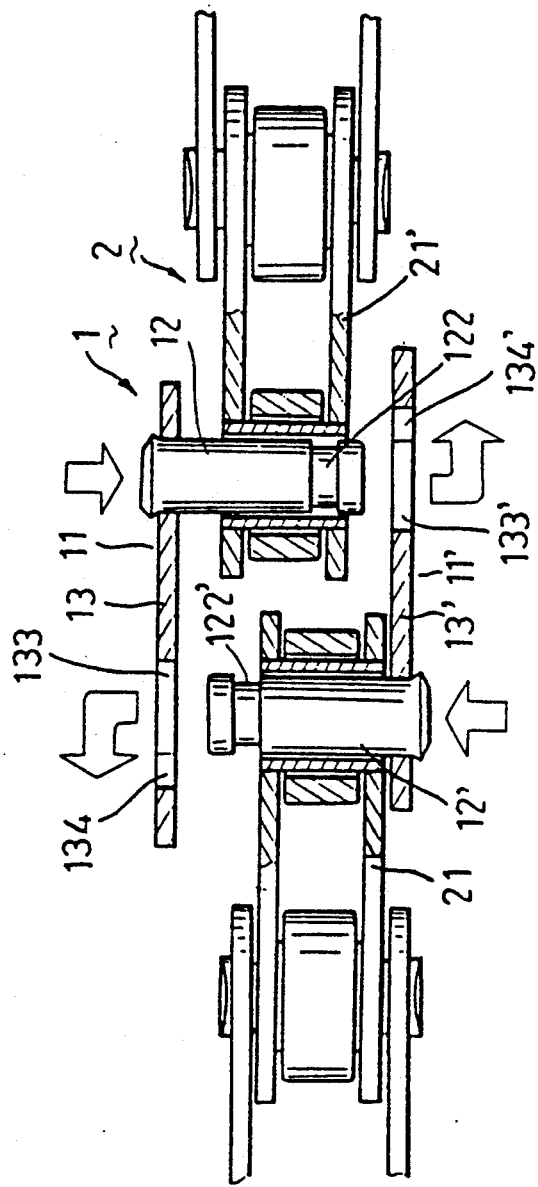
FIG. 2 is a sectional view illustrating the conventional knuckle connector shown in FIG. 1 when used to connect the end knuckles of a chain strand.
Figure 3:
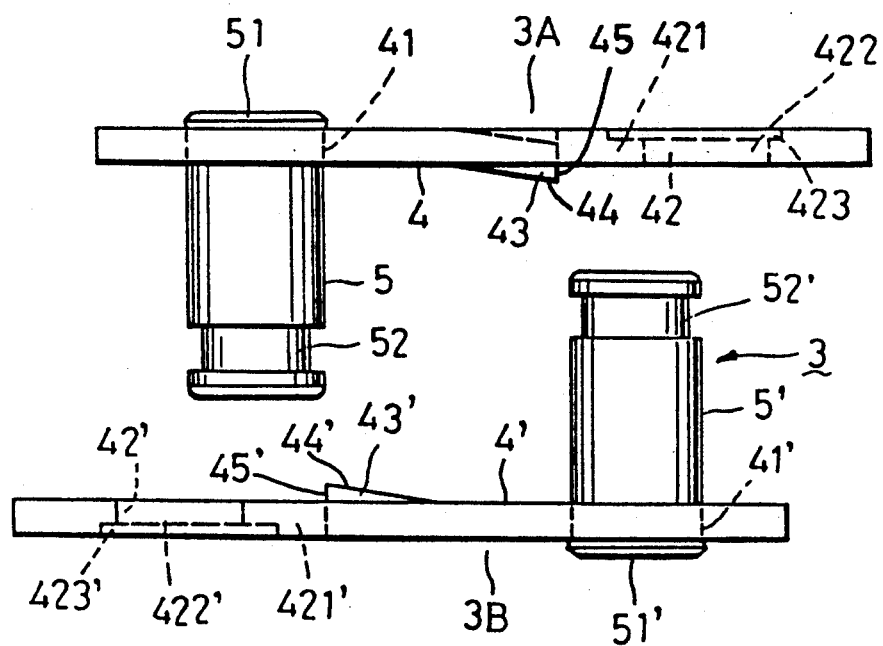
FIG. 3 is a side view of the preferred embodiment of a knuckle connector according to the present invention.
Figure 4:
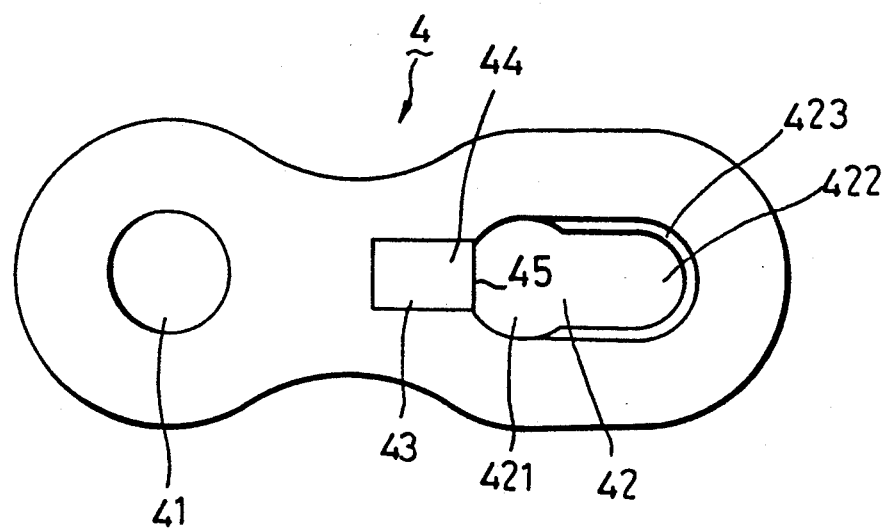
FIG. 4 is a top view of a link plate of one of the link units of the preferred embodiment.

Referring to FIGS. 3 and 4, the preferred embodiment of a knuckle connector (3) according to the present invention is shown to comprise a pair of link units (3A, 3B), each of which includes a link plate (4, 4') and a link pin (5, 5').

The link plate (4, 4') is oval-shaped and is formed with a circular through-hole (41, 41') on one end and a retaining hole (42, 42') on an opposite end. The retaining hole (42, 42') is oblong-shaped and includes a large insert part (421, 421') and a diameter-reduced retaining part (422, 422') that is communicated with the insert part (421, 421'). The outer surface of the link plate (4, 4') is formed with a peripheral groove (423, 423') around the retaining part (422, 422') of the retaining hole (42, 42'). The link plate (4, 4') is further provided with an inclined stop member (43, 43') that is formed by punching the link plate (4, 4') at one side of the insert part (421, 421') opposite to the retaining part (422, 422'). The stop member (43, 43') comprises a cantilevered tab (44, 44') and an end knuckle abutment face (45, 45'). The stop member (43, 43') projects relative to an inner surface of the link plate (4, 4'), as shown in FIG. 5.

The link pin (5, 5') includes a shank with a head (51, 51') and a tail end that is formed with a peripheral channel (52, 52'). During manufacture of the knuckle connector (3), the link pin (5, 5') is extended into the circular through hole (41, 41') in the link plate (4, 4') such that the head (51, 51') of the former is secured in the through hole (41, 41') of the latter.

Figure 5:
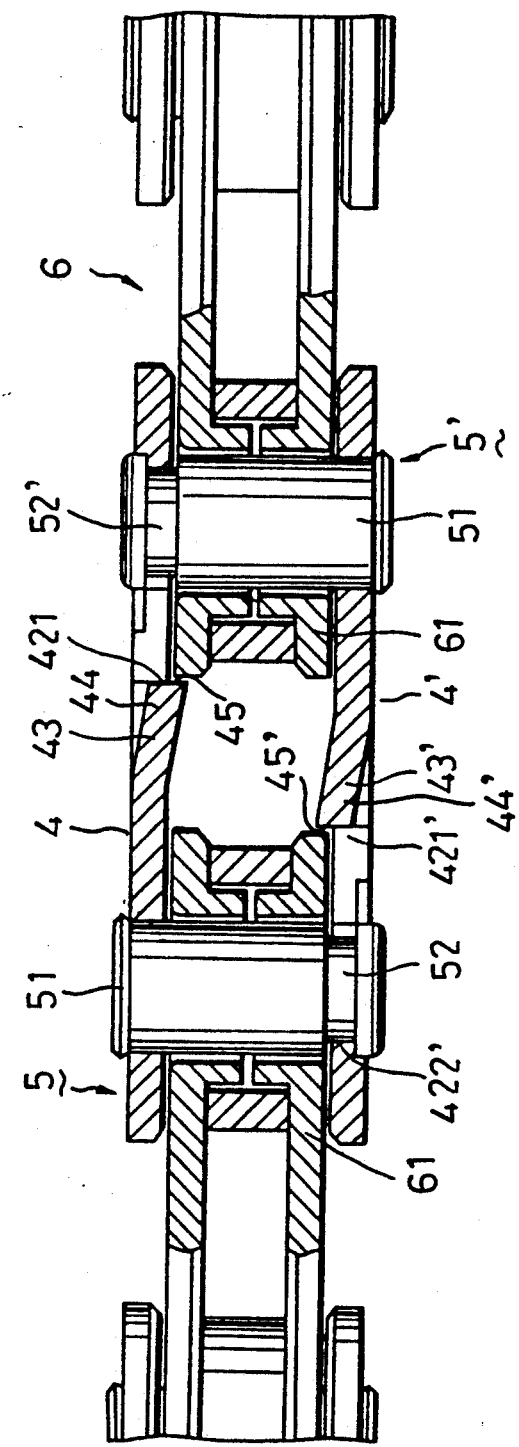
FIG. 5 is a sectional view illustrating the preferred embodiment when used to connect the end knuckles of a chain strand.

Referring to FIGS. 3 and 5, when the knuckle connector (3) is used to interconnect the end knuckles (61) of a chain strand (6), the link pins (5, 5') of the link units (3A, 3B) are extended through a pin hole formed in a corresponding one of the end knuckles (61) such that the peripheral channel (52, 52') extends into the insert part (421, 421') of the retaining hole (42, 42') in the link plate (4, 4') of the other link unit (3A, 3B). The end knuckles (61) are then pulled apart so that the peripheral channel (52, 52') of the link pin (5, 5') of one of the link units (3A, 3B) engages the link plate (4, 4') of the remaining one of the link units (3A, 3B) in the retaining part (422, 422') of the retaining hole (42, 42') of the latter, thereby forming a chain loop.

After assembly, the stop members (43, 43') of the link plates (4, 4') extend into the space formed between the end knuckles (61) and face a respective one of the end knuckles (61). The end knuckle abutment faces (45, 45') of the stop members (43, 43') can prevent movement of the end knuckles (61) toward one another, thereby preventing the peripheral channels (52, 52') of the link pins (5, 5') from moving simultaneously into the insert part (421, 421') of the retaining hole (42, 42'). Untimely disengagement of the link pins (5, 5') from the link plates (4, 4') is thus prevented to prevent accordingly the disengagement of the end knuckles (61).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A knuckle connector for connecting spacedly end knuckles of a chain strand to form a chain loop, each of said end knuckles having a pin hole formed therethrough, said knuckle connector including a pair of link units, each of said link units including a link pin and an oval-shaped link plate formed with a circular through-hole on one end and a retaining hole on an opposite end, said through-hole being defined by a through-hole surface, said through-hole surface having an inner diameter, said retaining hole including a large insert part and a diameter-reduced retaining part that is communicated with said insert part, said link pin having a head end and a tail end, said head end being opposite said tail end, said head end having a head end surface, said head end surface having an outer diameter, said inner diameter of said through-hole and said outer diameter of said head end being substantially identical, said head end being secured in said through-hole by the mating of said inner surface of said through-hole and said outer surface of said head end, said tail end having defined therein a peripheral channel, said link pin of one of said link units extending through said pin hole in a corresponding one of said end knuckles such that said tail end initially extends into said insert part of said retaining hole in said link plate of a remaining one of said link units, said peripheral channel of said link pin of said one of said link units engaging said link plate of said remaining one of said link units in said retaining part of said retaining hole when said end knuckles are pulled apart, said link units defining a space between said end knuckles of said chain strand when said link units are engaged with each other, wherein the improvement comprises:

said link plate of each said link unit having an inner side and an outer side, each link plate of said link unit being provided with a stop member, said stop member comprising a cantilevered tab, said tab having an end knuckle abutment face, said tab extending in an inclined manner away from said inner side of said link plate, said tabs of said stop members of said link plates extending into said space between said end knuckles and facing a respective one of said end knuckles, said end knuckle abutment face of each said stop members being engaged with one of said end knuckles whereby said stop members prevent movement of said end knuckles toward one another.

* * * * *